United States Patent
Düll et al.

(10) Patent No.: US 9,466,032 B2
(45) Date of Patent: Oct. 11, 2016

(54) METHOD FOR THE COMPUTER-SUPPORTED GENERATION OF A DATA-DRIVEN MODEL OF A TECHNICAL SYSTEM, IN PARTICULAR OF A GAS TURBINE OR WIND TURBINE

(75) Inventors: Siegmund Düll, München (DE);
Alexander Hentschel, München (DE);
Volkmar Sterzing, Neubiberg (DE);
Steffen Udluft, Eichenau (DE)

(73) Assignee: SIEMENS AKTIENGESELLSCHAFT (DE)

( * ) Notice: Subject to any disclaimer, the term of this patent is extended or adjusted under 35 U.S.C. 154(b) by 391 days.

(21) Appl. No.: 14/123,401

(22) PCT Filed: Jun. 1, 2012

(86) PCT No.: PCT/EP2012/060400
§ 371 (c)(1),
(2), (4) Date: Dec. 2, 2013

(87) PCT Pub. No.: WO2012/164075
PCT Pub. Date: Dec. 6, 2012

(65) Prior Publication Data
US 2014/0100703 A1    Apr. 10, 2014

(30) Foreign Application Priority Data
Jun. 3, 2011 (DE) .......... 10 2011 076 936

(51) Int. Cl.
*G06F 19/00* (2011.01)
*G06N 99/00* (2010.01)
(Continued)

(52) U.S. Cl.
CPC .......... *G06N 99/005* (2013.01); *G05B 13/04* (2013.01); *G05B 17/02* (2013.01); *G05B 23/024* (2013.01); *G06N 3/0481* (2013.01)

(58) Field of Classification Search
USPC ................... 700/47, 289; 701/100
See application file for complete search history.

(56) References Cited

U.S. PATENT DOCUMENTS

| 5,335,291 A | 8/1994 | Kramer |
| 5,485,545 A * | 1/1996 | Kojima .......... G05B 13/027 706/23 |
| 5,598,075 A * | 1/1997 | Liang .......... B23H 7/18 219/69.13 |
| 7,421,348 B2 | 9/2008 | Swanson |

(Continued)

FOREIGN PATENT DOCUMENTS

| CN | 101180590 A | 5/2008 |
| CN | 101695190 A | 4/2010 |

(Continued)

OTHER PUBLICATIONS

Russian Federation Office Action, dated Sep. 15, 2015, issued in corresponding Russian Federation Patent Application No. 2013157156/11(089098). Total 12 pages.
(Continued)

*Primary Examiner* — Kidest Bahta
(74) *Attorney, Agent, or Firm* — Ostrolenk Faber LLP (57) ABSTRACT

A method for the computer-supported generation of a data-driven model of a technical system, in particular of a gas turbine or wind turbine, based on training data is disclosed. The data-driven model is preferably learned in regions of training data having a low data density. According to the invention, it is thus ensured that the data-driven model is generated for information-relevant regions of the training data. The data-driven model generated is used in a particularly preferred embodiment for calculating a suitable control and/or regulation model or monitoring model for the technical system. By determining optimization criteria, such as low pollutant emissions or low combustion dynamics of a gas turbine, the service life of the technical system in operation can be extended. The data model generated by the method according to the invention can furthermore be determined quickly and using low computing resources, since not all training data is used for learning the data-driven model.

25 Claims, 1 Drawing Sheet

(51) Int. Cl.
  *G05B 17/02* (2006.01)
  *G05B 23/02* (2006.01)
  *G05B 13/04* (2006.01)
  *G06N 3/04* (2006.01)

(56) References Cited

U.S. PATENT DOCUMENTS

| | | | |
|---|---|---|---|
| 7,660,636 B2* | 2/2010 | Castel | A61N 1/36014 607/118 |
| 8,065,022 B2 | 11/2011 | Minto | 700/29 |
| 8,214,181 B2 | 7/2012 | Swanson | |
| 8,620,633 B2 | 12/2013 | Swanson | |
| 2005/0149234 A1* | 7/2005 | Vian | G05B 23/024 706/23 |
| 2006/0047482 A1* | 3/2006 | Yuan | G06F 11/0751 702/185 |
| 2009/0070047 A1* | 3/2009 | Swanson | G05B 17/02 702/32 |
| 2010/0094788 A1 | 4/2010 | Schäfer et al. | |
| 2010/0205974 A1 | 8/2010 | Schneegass et al. | |
| 2010/0257866 A1 | 10/2010 | Schneegass et al. | |
| 2011/0135166 A1* | 6/2011 | Wechsler | G06K 9/00288 382/118 |
| 2011/0172504 A1* | 7/2011 | Wegerich | A61B 5/0205 600/301 |
| 2012/0072029 A1* | 3/2012 | Persaud | G06N 5/04 700/276 |
| 2013/0013543 A1 | 1/2013 | Düll et al. | |

FOREIGN PATENT DOCUMENTS

| | | |
|---|---|---|
| CN | 101701845 A | 5/2010 |
| CN | 101819411 A | 9/2010 |
| DE | 102007001025 A1 | 7/2008 |
| DE | 102007017259 A1 | 10/2008 |
| DE | 102007042440 B3 | 1/2009 |
| DE | 102010011221 A1 | 9/2011 |
| JP | 2011-090627 A | 5/2011 |
| RU | 2482307 C2 | 7/2010 |
| WO | WO 02/03041 A1 | 1/2002 |

OTHER PUBLICATIONS

Office Action dated May 22, 2015 and Search Report in corresponding Chinese Patent Application No. 201280027163.8 (with English language translation)(15 pages).

European Search Report and Opinion dated Jun. 18, 2015 in corresponding European Patent Application No. 12727342.3 (7 pages).

International Search Report and Written Opinion dated Dec. 18, 2012 issued in corresponding International Application No. PCT/EP2012/060400 (English language translation).

Martin Riedmiller: Neural Fitted Q Iteration—First Experiences with a Data Efficient Neural Reinforcement Learning Method. ECML 2005: 317-328.

B. Lang et al.: "Neural clouds for monitoring of complex systems", Optical Memory & Neural Networks, vol. 17, No. 3 (2008), pp. 183-192; 2008; Jan. 1, 2007.

International Search Report and Witten Opinion in German dated Dec. 18, 2012 issued in corresponding international patent application No. PCT/EP2012/060400.

Office Action dated Oct. 27, 2015 in corresponding Japanese Patent Application No. 2014-513206 (2 pages).

Chinese Office Action, dated May 19, 2016, issued in corresponding Chinese Patent Application No. 201280027163.8. Total 5 pages.

* cited by examiner

METHOD FOR THE COMPUTER-SUPPORTED GENERATION OF A DATA-DRIVEN MODEL OF A TECHNICAL SYSTEM, IN PARTICULAR OF A GAS TURBINE OR WIND TURBINE

Method for the computer-aided generation of a data-driven model of a technical system, in particular of a gas turbine or wind turbine.

CROSS-REFERENCE TO RELATED APPLICATIONS

The present application is a 35 U.S.C. §§371 national phase conversion of PCT/EP2012/060400, filed Jun. 1, 2012, which claims priority of German Patent Application No. 10 2011 076 936.6, filed Jun. 3, 2011, the contents of which are incorporated in full by reference herein.

FIELD OF THE INVENTION

The invention relates to a method for the computer-aided generation of a data-driven model of a technical system, particularly a gas turbine or wind turbine, and to an appropriate computer program product.

RELATED ART

A technical system can be operated automatically by using data-driven models that are learnt on the basis of appropriate training data, which are operating variables for the technical system. In this case, such a learnt data-driven model is intended to reflect the behavior of the technical system and can then be used to create monitoring and/or regulatory models of the relevant technical system. These monitoring or regulatory models can then be used in the real operation of the technical system in order to set appropriate manipulated variables for the system on the basis of the current operating variables or to establish faulty operating states of the technical system in automated fashion.

Usually, the training data that are used to learn a data-driven model are not distributed evenly in the state space of the operating variables for the technical system. In this context, operating ranges of the technical system that represent normal operation normally have far more data than limit ranges of the operation or for faulty operating states of the technical system. This problem arises particularly when controlling gas and wind turbines, which are usually not operated in limit ranges in order to avoid damage. Hence, regularly frequented operating ranges of the gas turbine or wind turbine have a very large quantity of usable training data records, the information content of which is for the most part redundant, however. By contrast, there are few data available for rarely approached operating modes.

There are therefore ranges of different data density for the training data that are used for learning a data-driven model. Normally, this data density is not taken into account when selecting appropriate training data and when generating a model of the relevant technical system on the basis thereof. This can result in relevant regulatory and monitoring models that are calculated on the basis of the data-driven models outputting incorrect or below-optimum regulatory actions or incorrect warnings during the operation of the technical system. By way of example, it is thus possible for cold-weather events that arise during the operation of a gas or wind turbine and did not feature in the training phase of the data-driven model to lead to the initiation of false alarms. Similarly, a data-driven model that is learnt only using training data for typical operating states can result in increased model errors, as a result of which a regulatory or control model based thereon does not provide optimum settings for relevant manipulated variables, such as the quantity of gas supplied or the position of preliminary guide vanes in a gas turbine, during real operation of the technical system. This can result in a reduction in the power or efficiency or life of the technical system.

Conventionally, the generation of a data-driven model of a technical system involves the use, following the elimination of outliers or errors, of either all data records for the training data or a random selection of these data records. Taking into account all training data produces a very large and ever growing volume of training data that slows down the generation of a relevant data-driven model and can result in resource problems for the computer(s) that are used to generate the data-driven model (e.g. insufficient main memory size). Although the simple limitation to a random selection of training data records speeds up the calculation of the data-driven model, it increases the risk of relevant information about the technical system being lost. This problem is aggravated in the case of data-driven models that represent the dynamic behavior of the technical system by virtue of it always being necessary to take into account a defined quantity of temporally related data records collectively when learning the model.

SUMMARY OF THE INVENTION

It is an object of the invention to provide a method for the computer-aided generation of a data-driven model that learns a good data-driven model of a technical system using a relatively small quantity of computation resources.

This object is achieved by a method for computer-aided generation of a data-driven model of a technical system, the technical system being a gas turbine or a wind turbine, for use for automated monitoring and/or forecasting and/or regulatory tasks, wherein the data-driven model is generated based on training data that comprise a plurality of data records, each record representing a plurality of operating variables for the technical system, the method comprising: learning, for a plurality of iteration steps, each of the data-driven model and a density estimator by means of data records from the training data; outputting by a density estimator a confidence measure for all data records from the training data, said confidence measure being higher when a greater similarity exists of a respective data record to other data records from the training data; reproducing by the data-driven model data records for the training data with a model error in each case; for learning in a next iteration step, selecting or weighting by the density estimator and the data-driven model that have been learnt in a respective iteration step data records from the training data, wherein data records from the training data with low confidence measures and high model errors are more readily selected or more highly weighted. Developments of the invention are defined in the dependent claims.

The method according to the invention is used for the computer-aided generation of a data-driven model of a technical system and particularly a gas turbine or wind turbine. The data-driven model is preferably used for use for automated monitoring and/or forecasting and/or regulatory tasks (MPC) in the technical system and is created on the basis of training data that comprise a multiplicity of data records that each represent a plurality of operating variables for the technical system. A plurality of operating variables is intended to be understood to mean measured variables and possibly also manipulated variables for the technical system. In this case, the measured variables are variables that have been ascertained on or in the environment of the technical system using suitable sensors or have been derived from sensor values. Manipulated variables are such operating variables for the technical system as are able to be set or varied so as thereby to influence the operation of the technical system.

The method according to the invention takes place iteratively, with the data-driven model and a density estimator being learnt by means of data records from the training data for each of a number of iteration steps. The data-driven model learnt following the conclusion of the iteration is then the data-driven model generated using the method according to the invention. The (learnt) density estimator outputs a confidence measure for all data records from the training data. The greater the similarity of a respective data record to other data records from the training data, the higher the confidence measure. In one preferred embodiment, the similarity of the data records is described using an appropriate distance measure in the space of the data points represented by the data records. In this case, the density estimator uses its confidence measure to indicate whether there is a high density in the data space and hence there are many similar data records based on the training data for a relevant data record. Methods that can be used to implement the density estimator that has just been described are sufficiently well known from the prior art and are therefore not explained in detail. In one preferred embodiment, the density estimator used is a method that is based on neural clouds. Preferably, this involves the use of a method that is described in B. Lang et al., Neural Clouds for Monitoring of Complex Systems, Optical Memory and Neural Networks (Information Optics), 2008, Vol. 17, No. 3, pp. 183-192 (hereinafter "Lang"). The entire disclosure content of this document is made the content of the present application by way of reference.

The data-driven model that is learnt in an iteration step in the method according to the invention is used to reproduce data records for the training data. In this context, a model error arises that is the difference between the reproduced data records and the actual data records on the basis of the training data. This model error should be as small as possible for a good-quality data-driven model. In this case, the data-driven model is embodied particularly such that a first portion of the operating variables from the respective data records for the training data is an input for the data-driven model, whereas the output from the data-driven model is a second portion of operating variables that the respective data records contain. In this case, the model error is provided by the difference between the second portion of the operating variables that are output via the data-driven model and the corresponding second portion of the operating variables from the relevant data record for the training data.

In the course of the method according to the invention, the density estimator and the data-driven model that have been learnt in a respective iteration step are used to select or weight data records from the training data for the learning in the next iteration step, wherein data records from the training data with low confidence measures and high model errors are more readily selected or more highly weighted. That is to say that a data record comprising the training data that has a lower confidence measure than another data record for the same model error is more readily selected or more highly weighted than the other data record. Similarly, a data record that has a higher model error than another data record for the same confidence measure is preferably selected or more highly weighted than the other data record.

The invention is based on the insight that particularly efficient learning of a data-driven model of a technical system is achieved when training data are used that have a high level of "novelty", i.e. the confidence measure of which is small and for which there are accordingly few similar data records. Similarly, for learning methods, those ranges of the training data for which the model is still erroneous, i.e. for which large model errors still arise, are of interest. The modeling of a suitable relationship in which the data records with low confidence measures or high model errors are taken into account more heavily in a new iteration step of the learning therefore achieves learning that allows computation-efficient generation of a good data-driven model of a technical system.

The method according to the invention can be used to extract the relationships that are present in large volumes of training data in a suitable manner and to use them for modeling the behavior of a technical system and particularly a gas or wind turbine. In this case, good modeling of the relevant technical system is made possible even when the data records for the training data contain only few operating variables or the volume of the training data is distributed over few data records. The method according to the invention involves the use of only the important information-related data records or ranges of training data, as a result of which the relevant model can be created quickly and with few computation resources. In addition, the method according to the invention optimizes the percentile performance of the generated data-driven model. This is advantageous particularly when the data-driven model is used for computer-aided control or monitoring of a technical system.

The method according to the invention also has the advantage that it delivers a learnt density estimator that can subsequently be integrated when calculating a control and/or regulatory model or monitoring model of the technical system. In this case, the density estimator that is used in the relevant control or monitoring model delivers information about the significance of the current operating variables for the technical system. In particular, appropriate reporting thresholds or maximum values for changes in the manipulated variables can be customized dynamically. This allows false alarms to be avoided in the realtime monitoring of technical systems and particularly gas or wind turbines. In addition, authorization of a generated data-driven model can be made dependent on the confidence measure and hence the data density of the relevant data record for the current operating variables for the technical system, i.e. only an adequate data density prompts the operation of the data-driven model or of the technical system to be commenced or continued. This makes it possible to avoid manipulated-variable settings on the technical system that result in damage to the technical system, for example on account of excessive internal combustion dynamics for a gas turbine.

The data-driven model generated by the method according to the invention can also be used to model the dynamic (i.e. time-dependent) behavior of a technical system, in particular. In this case, a data record comprises not only operating variables for the same instant but also a series of operating variables for associated instants in line with the architecture of the data-driven model.

With the method according to the invention, the data-driven model learnt is preferably a neural network and particularly a recurrent neural network. Such recurrent neural networks can be used very well to reproduce the behavior of a technical system on the basis of relevant training data.

The neural network is preferably learnt using an inherently known error back propagation method. In one particularly preferred embodiment, the neural network used is the network described in the document DE 10 2010 011 221 A1, which network is also called a Markov decision process extraction network.

The method according to the invention is particularly well suited to modeling a gas turbine. Suitable measured variables for the gas turbine that are taken into account as operating variables for the technical system in the data records comprise one or more of the following variables:
- the temperature in the environment in which the gas turbine is operated;
- the humidity in the environment in which the gas turbine is operated;
- the air pressure in the environment in which the gas turbine is operated;
- the power of the gas turbine, particularly a percentage power value;
- the fuel quality for the gas turbine;
- the pollutant emission by the gas turbine, particularly the emission of nitrogen oxides and/or carbon monoxide;
- the temperature of one or more turbine blades in the gas turbine;
- the exhaust temperature of the gas turbine;
- the internal combustion dynamics of the gas turbine.

In this case, the aforementioned term "internal combustion dynamics" relates to the amplitude values—sensed using suitable sensors—for pressure fluctuations in the gas turbine.

By contrast, for a gas turbine, one or more of the following manipulated variables have been found to be particularly suitable as operating variables in the data records:
- the position of one or more guide vanes in the gas turbine;
- the quantity of gas supplied to the gas turbine;
- a setpoint value for the exhaust temperature of the gas turbine.

In this case, it should be borne in mind that in gas turbines it is possible to set a desired value for the exhaust temperature of the turbine, usually using a suitable regulator. This value corresponds to the aforementioned setpoint value.

A further preferred area of use of the method according to the invention is the creation of a data-driven model for a wind turbine. In this case, the measured variables used for the operating variables in the data records are preferably one or more of the following variables:
- the electrical power generated with the wind turbine;
- the wind speed in the environment in which the wind turbine is operated;
- the speed of the wind turbine;
- the flexural forces and/or deflections and/or variations in stress on the rotor blades of the wind turbine;
- the vibration in the tower of the wind turbine.

The manipulated variables used for the operating variables for a wind turbine in the data records are preferably one or more of the following variables:
- the angle of attack of the rotor blades of the wind turbine;
- the family of characteristic curves for the wind turbine, representing the relationship between speed and the power generated by the wind turbine.

In a further, particularly preferred embodiment, the data-driven model generated by the method according to the invention is used to calculate a control and/or regulatory model for the operation of the technical system on the basis of one or more optimization criteria. This calculated control and/or regulatory model specifies changes for one or more manipulated variables from the operating variables for the technical system on the basis of one or more measured variables from the operating variables for the technical system and thereby allows suitable setting of the manipulated variables during real operation of the technical system.

When the control and/or regulatory model of a gas turbine is calculated, the optimization criterion or criteria preferably comprise a lowest possible pollutant emission and/or lowest possible internal combustion dynamics or else a highest possible efficiency (heat rate) or a highest possible power. This ensures environmentally friendly operation of the gas turbine and a long life for the turbine.

When the control and/or regulatory model for a wind turbine is calculated, the optimization criterion or criteria particularly comprise a highest possible efficiency for the wind turbine and/or lowest possible flexural forces on the rotor blades of the wind turbine. This ensures optimum operation and in turn a long life for the wind turbine.

In a further, particularly preferred embodiment, the control and/or regulatory model is embodied such that the respective confidence measures for data records comprising operating variables that arise during operation of the technical system are ascertained using the learnt density estimator, wherein the change in one or more manipulated variables from the operating variables is limited and/or the operation of the function connected to the data-driven model and/or of the technical system is terminated or not started in the first place when the relevant confidence measure is below a predetermined threshold. In this way, the density estimator learnt in the course of the method according to the invention can also be used to authorize the operation of the technical system only when the operating variables for the technical system are in a range with sufficiently high data density.

In a further embodiment of the method according to the invention, the generated data-driven model is used to calculate a monitoring model that, in the event of one or more operating variables that arise during operation of the technical system deviating from the relevant operating variable(s) reproduced using the generated data-driven model by more than a predetermined measure, outputs a warning report and/or alarm report and/or initiates an automated safety measure for the technical system. Preferably, in such a monitoring model, the learnt density estimator can also be suitably taken into account. In this case, the monitoring model is embodied such that respective confidence measures for data records comprising operating variables that arise during operation of the technical system are ascertained using the learnt density estimator, wherein the predetermined measure that is taken as a basis for generating a warning report is set greater the smaller the respective confidence measure on the input variables for the model. In this way, the reporting threshold for data records with low data density is suitably raised. If need be, in the event of the respective confidence measure being less than a predetermined threshold value, it is also possible to output the report that it is not currently possible to output warning reports on account of excessively low data density and hence no monitoring is possible.

In one particularly preferred embodiment, the control and/or regulatory model and/or the monitoring model are calculated on the basis of reinforcement learning and/or on the basis of model-predictive regulation and/or on the basis of an optimization method. In this case, methods of reinforcement learning and of model-predictive regulation are sufficiently well known from the prior art. Similarly, appropriate optimization methods are known. By way of example, the optimization method can be performed on gradient-based or stochastic search methods for the appropriately defined optimum value in line with the control or regulatory model or monitoring model. In a further, particularly preferred embodiment, the control and/or regulatory model and/or the monitoring model is learnt on the basis of a neural network, particularly a recurrent neural network.

Particularly suitable techniques for calculating an appropriate control and/or regulatory model or monitoring model are methods that are described in the document DE 10 2007 001 025 A1 (recurrent control neural network) or DE 10 2007 017 259 A1 (neural rewards regression) or DE 10 2007 042 440 B3 (policy gradient neural rewards regression). Similarly, the neural fitted Q iteration known from the prior art (see document [2]) can be used for calculating appropriate control and/or regulatory models or monitoring models.

If need be, regularization methods can be used for learning a control and/or regulatory model or a monitoring model with a neural network. By way of example, what is known as a penalty term for weights in the neural network (weight penalty term) can be added besides the error for the respective data record, as a result of which rather linear and hence better extrapolating models are produced in regions with low data density. Similarly, the weights in the neural network that have been selected using the inherently known rating function "inverse kurtosis" can be clipped off, which stabilizes the behavior in data regions with a low data density. This is advantageous particularly when calculating a control and/or regulatory model for a gas or wind turbine.

In one preferred embodiment, the relationship between confidence measures or model errors and the selection or weighting of the data records is modeled for the generation of the data-driven model using a function. In this case, a function is defined that is dependent on the confidence measure and on the model error, wherein the function takes the confidence measure and model error for a data record as the basis for stipulating whether a data record is selected or what level the weighting of the data record is at. Depending on the application, the function may be embodied in different ways. Specific stipulation of such a function is within the scope of action of a person skilled in the art. By way of example, the function can model the relevant relationships discontinuously by means of staircases or continuously in a suitable fashion.

In a further preferred embodiment of the method according to the invention, the data records are selected during the generation of the data-driven model such that they are taken by means of sampling for the next iteration step on the basis of probabilities associated with the data records. That is to say that the data records are assigned probabilities in a suitable fashion on the basis of the respective confidence measures or model errors, which probabilities are then taken into account for sampling. The probabilities can be assigned using the function described above, for example.

In a further embodiment of the method according to the invention, the data records from the training data are allocated weights that are taken into account when learning the density estimator and the data-driven model, wherein the weights are updated by means of the density estimator and of the data-driven model that have been learnt in a respective iteration step, such that data records from the training data with low confidence measures and high model errors are provided with higher weights. The weights can be taken into account in various ways via the density estimator or the data-driven model. In one variant of the invention, the weights represent probabilities that are processed by the density estimator and the data-driven model. By way of example, the density estimator and/or the data-driven model can select data records from training data on the basis of the probabilities thereof for the learning. The probabilities can also be suitably taken into account in the course of the learning, for example in a stochastic gradient descent method that is used by the density estimator or data-driven model.

The method according to the invention can be initialized in various ways. In one embodiment, the method is initialized with a subset of data records from the training data that is stipulated on a random basis, for example. Similarly, the method can be started with all data records from the training data using suitably stipulated initial weights.

By way of example, the model errors ascertained in the course of the method according to the invention can be represented by the absolute-value deviation in the data record reproduced using the data-driven model or in the reproduced operating variables for the data record from the relevant data record of the training data or from the relevant operating variables for this data record. Similarly, the model errors may be relative deviations for which the absolute-value deviation is ascertained in relation to the standard deviation in all model errors for the data records that are reproduced in the respective iteration step.

The confidence measure that is output in the method according to the invention may likewise be suitably normalized, e.g. to a range between zero and one, with the value zero representing no confidence (i.e. low data density) and the value one representing high confidence (i.e. high data density).

The iteration carried out in the course of the method according to the invention can be terminated on the basis of various criteria. In one preferred embodiment, the iteration is terminated when at least a predetermined proportion of the model errors for the data records selected or weighted for the next iteration step are below a predetermined threshold and/or when at least a predetermined proportion of the confidence measures for the data records selected or weighted for the next iteration step are above a prescribed threshold. This ensures that the method is terminated when a particular minimum quality for the learnt data-driven model has been reached. In this case, the predetermined proportion may be 95% or 99% or more of all model errors or confidence measures, for example.

In a further embodiment of the method according to the invention, the iteration is terminated when the average model error for the data records selected and weighted for the next iteration step is no longer becoming smaller in comparison with the preceding iteration step and/or all confidence measures for the data records selected and weighted for the next iteration step are above a predetermined threshold.

Besides the method described above for generating a data-driven model, the invention also relates to a method for operating a technical system, in which a data-driven model is generated or has been generated using the method according to the invention or using one or more preferred variants of the method according to the invention and is subsequently used for analyzing and/or influencing (particularly directly influencing) the operation of the technical system.

This method therefore uses the inventively generated data-driven model for the real operation of a technical system. Preferably, this involves the use of a variant for generating the data-driven model, which variant calculates a control and/or regulatory model or monitoring model. In this case, the technical system is regulated and/or controlled and/or monitored using the control and/or regulatory model and/or the monitoring model.

Besides the methods described above, the invention also relates to a computer program product having a program code, stored on a machine-readable storage medium, for carrying out the method according to the invention or one or more preferred variants of the method according to the invention when the program code is executed on a computer.

BRIEF DESCRIPTION OF THE FIGURES

Exemplary embodiments of the invention are described in detail below with reference to the appended figures, in which.

DETAILED DESCRIPTION OF THE INVENTION

The embodiments of the method according to the invention that are described below are used to generate a data-driven model of the technical system by using training data comprising a multiplicity of data records. The data-driven models generated with these embodiments can then be used in a suitable fashion to calculate appropriate control and/or regulatory models or monitoring models for the technical system, as has been described above. These control and/or regulatory models or monitoring models can then be used during the real operation of the technical system, as has likewise been illustrated above. In this case, a particularly preferred application for the embodiments described below is the generation of a data-driven model for a gas or wind turbine.

In the embodiment described here, the individual data records are vectors that comprise a multiplicity of operating variables for a technical system. Examples of such operating variables have been cited above for gas and wind turbines. In one embodiment, the operating variables for the vectors are temporally successive measured variables and manipulated variables for the technical system, as a result of which the data-driven model is used to learn dynamic behavior of the technical system. The operating variables in the training data have been captured during the real operation of the technical system and stored in a database.

The aim of the method according to the invention is now to extract the relevant information from the training data and to eliminate redundant information, as a result of which the quality of the data-driven model that is learnt using the training data is improved. In particular, the aim in this case is to improve what is known as the percentile performance of the learnt model. This means that the quality of the data-driven model in operating ranges of the technical system with few data records is intended to be increased.

Figure 1:
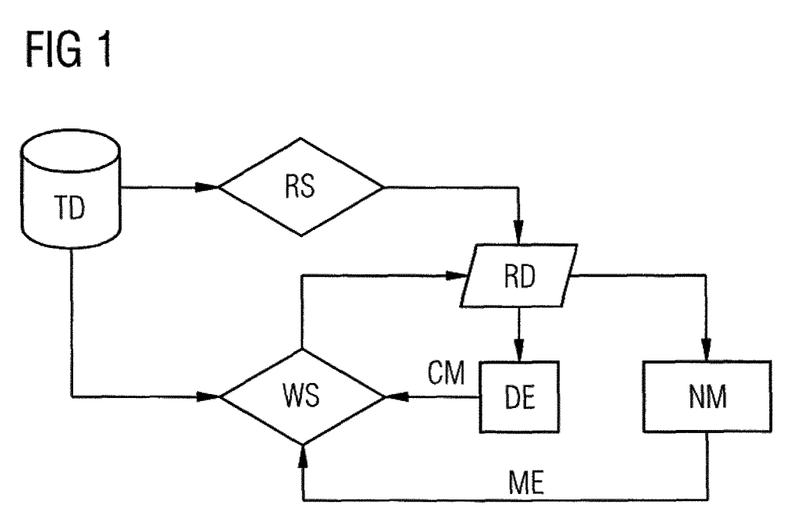
FIG. 1 shows a schematic illustration of a first embodiment of the method according to the invention.

FIG. 1 shows an embodiment of the method according to the invention in which training data TD are processed that are stored in an appropriate database. As already mentioned, these training data relate to data records in the form of operating variables for a technical system, with preliminary filtering possibly having been performed, as a result of which only particular operating variables—relevant to the data-driven model—for the data records or only particular data records are processed further in the method. The embodiment in FIG. 1 is based on the idea that the data-driven model is learnt by suitably selecting subsets from the training data TD by means of sampling. During the initialization of the method, a subset of the training data is first of all randomly selected in the step RS (RS=Random Sampling). This subset is denoted by RD (RD=Reduced Dataset) in FIG. 1. This subset is used to learn a data-driven model in the form of a neural network or a neural model NM, to which end inherently known learning methods, such as reinforcement learning, are used.

In parallel, the subset is used to learn a density estimator or data encapsulator DE. In the embodiment described here, the data encapsulator used is the density estimator based on neural clouds known from Lang. The density estimation based on this method is known and is therefore not described in detail. The aim of the density estimation is to ascertain the "novelty" of a relevant data record or data point by considering the extent to which further data records for the training data are similar to the data record under consideration, the similarity being described by a distance of the data records in relation to one another. This distance is provided by the Euclidean distance of the data points in the data space. The density estimator known from Lang is first of all used to perform normalization of the individual data records or data points on the basis of a min/max normalization method. Next, the datapoints are clustered on the basis of a modification of the K means algorithm known from the prior art, which is also called the "advanced K means" algorithm. This algorithm delivers cluster centers in the space of the data points. In a subsequent step, Gaussian bells are placed over the centers, and then the Gaussian bells are normalized. As the end result of the algorithm, a learnt data encapsulator is then obtained that ascertains for a respective data record a confidence that represents the similarity of the data record to data records from the training data and, like in Lang above, is rated as a probability of failure for the technical system under consideration.

Following the conclusion of the learning of the neural network NM, data records from the training data can be reproduced except for a model error. In this case, a particular proportion of the operating variables for a data record is processed as an input vector for the neural network. The neural network then delivers other operating variables for the relevant data record as output vector. The relevant model error is obtained from the difference between the actual output vector based on the training data and the output vector calculated using the neural network.

In the embodiment in FIG. 1, relevant confidences CM for the data encapsulator DE and relevant model errors ME for the neural network NM are used to perform weighted sampling WS. For the weighted sampling, the model error obtained with the learnt neural network and the confidence obtained via the data encapsulator are respectively ascertained for all data records from the training data TD. For each combination of these values, a probability is stipulated for the relevant data record, the probabilities being normalized to 1 for all data records. In this case, the probabilities are determined in a suitable fashion such that a data record with a low confidence has a higher probability than a data record with a higher confidence for the same model error. In addition, the probabilities are stipulated such that a data record with a high model error has a greater probability than a data record with a low model error for the same confidence. Next, these probabilities are used to perform the sampling WS. In this case, the sampling more readily removes such data records from the training data as have a high degree of novelty on the basis of low confidence or which are reproduced poorly by the data-driven model.

Following the performance of the sampling WS, a new subset of data records RD is obtained that are now used in a subsequent iteration step for the further learning of the data encapsulator DE and of the neural network NM. Next, new weighted sampling WS again takes place, but for this purpose the relevant probabilities for the sampling are stipulated again using the relevant data encapsulator or the relevant neural network. Finally, the method is continued with the freshly generated subset of data records in the next iteration step.

The iterative learning of the data encapsulator or the neural network is terminated on the basis of a suitable termination criterion. In this case, the termination criterion is stipulated such that the method is terminated when for all data records for a freshly generated subset the respective model errors are less than a prescribed threshold value and the respective confidences are greater than a predetermined threshold value. As the end result of the method, a learnt neural network is obtained that can then be used to calculate a control and/or regulatory model or a monitoring model of the technical system.

Figure 2:
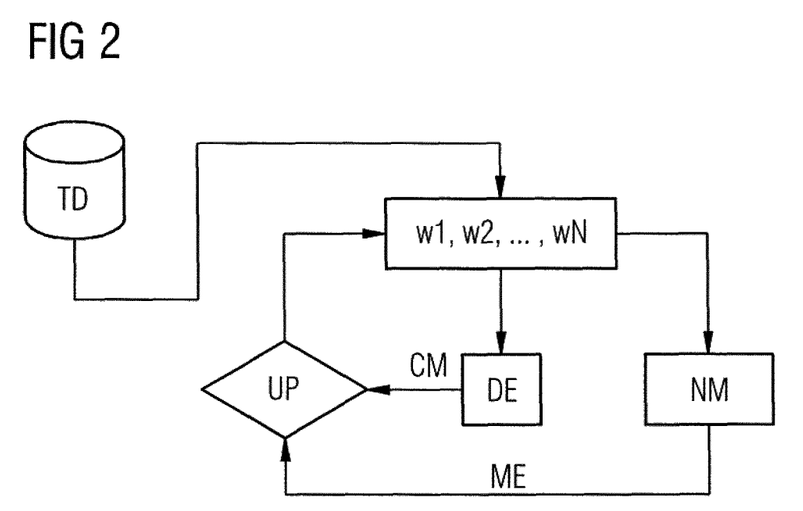
FIG. 2 shows a schematic illustration of a second embodiment of the method according to the invention.

FIG. 2 shows a second embodiment of the method according to the invention. In contrast to FIG. 1, the learning of the data encapsulator DE and of the neural network NM always involves the use of all data records for the training data TD (possibly in a suitably pre-filtered form). However, the data records have been weighted in a suitable fashion using the learnt data encapsulator or the learnt neural network. The method in FIG. 2 is suitably initialized at the beginning, with relevant weights w1, w2, . . . , wN for the N data records under consideration now being ascertained for the initialization on the basis of the training data. By way of example, the weights can be initialized on a random basis or with the value 1/N. In the embodiment described here, the weights are probabilities that are taken into account by the data encapsulator DE or the neural network NM.

In contrast to the embodiment in FIG. 1, all training data are now taken into account without prior selection. Using the probabilities represented by the weights, the data encapsulator—which corresponds to the density estimator in Lang—selects appropriate data records. The probabilities can be used in the data encapsulator during the normalization described above, with the probabilities being taken as a basis for selecting data records that are taken into account during the normalization. Similarly, the probabilities can be used for the clustering described above. In this case, the probabilities are used to select which data records are used for finding cluster centers. Similarly, the probabilities can be used for the distance calculation of cluster centers that is used in the data encapsulator. In this case too, the probabilities stipulate which data records are taken into account for the calculation of the distances. For the normalization, the clustering and the calculation of the distances, the correspondingly used data records can be determined once or re-ascertained separately for each of these steps.

In addition, the weights are used to select appropriate data records that are taken into account for or in the course of the learning of the neural network. By way of example, for learning on the basis of the selection of the data records, the gradient can be ascertained in the course of a known stochastic gradient descent method.

After the data encapsulator or the neural network has been learnt, an update step UP takes place, in which the learnt data encapsulator and the learnt neural network are taken as a basis for recalculating the original initialized weights. This occurs in analogy to FIG. 1 by virtue of the relevant confidences of the data encapsulator and the relevant model errors of the neural network being ascertained for all data records from the training data and being used to derive weights or probabilities such that a probability is higher the lower the confidence of the data record under consideration or the greater the model error of the data record under consideration. In this case, the stipulation of an appropriate relationship, for example on the basis of a function, is within the scope of action of a person skilled in the art. By way of example, a linear relationship can be modeled using an appropriate function.

The method of FIG. 2 is continued in a subsequent iteration step with the weights updated in the step UP. In this iteration step, the data encapsulator and the neural network are learnt once again by taking into account the new weights, and then the weights are updated again using the learnt data encapsulator or the learnt neural network. This iterative method is terminated using a suitable termination criterion, the termination criterion being stipulated, in analogy to FIG. 1, such that the method is terminated when the confidences for the data encapsulator that are obtained for the respective data records are above a prescribed threshold value or the model errors for the neural network that are obtained for the respective data records are below a predetermined threshold value. The neural network learnt in this manner can then in turn be used to calculate a model for controlling or monitoring the relevant technical system.

The embodiments of the method according to the invention that are described above have a series of advantages. In particular, it is possible to extract from a large volume of training data such data records as can easily be used to describe the technical system on which the data records are based. In this case, a suitable selection of subsets from the data records or weighting of the data records can be used to learn a data-driven model that takes into account ranges with few data records more heavily. Hence, such operating states for the technical system as deviate from normal operation are taken into account more heavily.

Through the selection of relevant data records, the method according to the invention can be used to achieve faster learning of an appropriate data-driven model on the basis of training data. In addition, the learnt data-driven model has better percentile performance, since learning preferably takes place in ranges with few data. Good percentile performance is important for the correct prediction of errors in the operation of a technical system.

REFERENCES

[1] B. Lang et al., Neural Clouds for Monitoring of Complex Systems, Optical Memory and Neural Networks (Information Optics), 2008, Vol. 17, No. 3, pp. 183-192
[2] M. Riedmiller, Neural Fitted Q Iteration—First Experiences with a Data Efficient Neural Reinforcement Learning Method, Proc. of the European Conf. on Machine Learning, 2005, pp. 317-328

The invention claimed is:

1. A method for generation of a model configured for at least one of automated monitoring, forecasting, and regulatory tasks of a technical system, wherein the model is generated based on training data that comprise a plurality of data records, each data record representing a plurality of operating variables for the technical system, the method comprising:
generating with a computer the model by
1) learning a data-driven model based on the training data;
2) learning a density estimator based on the training data in parallel with learning the data driven model;
3) outputting by the density estimator a confidence measure for all the data records, said confidence measure for a data record being higher when the data record is more similar to other data records from the training data, similarity being determined based on distances of data records in relation to one another in a data space;
4) reproducing by the data-driven model data records with model errors;
5) performing weighted sampling on the data records based on the confidence measures and the model errors, the data records with low confidence measures and high model errors being weighted relatively higher;
6) obtaining a new subset of data records from the weighted sampling; and
7) repeating steps 1 to 6 until a termination criterion is met.

2. The method as claimed in claim 1, wherein the data-driven model learnt is a neural network, particularly a recurrent neural network.

3. The method as claimed in claim 1, wherein the technical system is a gas turbine, and the operating variables for the technical system comprise at least one of the following measured variables:
a temperature in an environment in which the gas turbine is operated;
a humidity in the environment in which the gas turbine is operated;
an air pressure in the environment in which the gas turbine is operated;
a power of the gas turbine, particularly a percentage power value;
a fuel quality for the gas turbine;
a pollutant emission of at least one of nitrogen oxides and carbon monoxide by the gas turbine;
a temperature of one or more turbine blades in the gas turbine;
an exhaust temperature of the gas turbine; and
an internal combustion dynamics of the gas turbine.

4. The method as claimed in claim 1, wherein the technical system is a gas turbine, and the operating variables for the technical system comprise at least one of the following manipulated variables:
a position of at least one guide vanes in the gas turbine;
a quantity of gas supplied to the gas turbine;
a setpoint value for an exhaust temperature of the gas turbine.

5. The method as claimed in claim 1, wherein the technical system is a wind turbine, and the operating variables for the technical system comprise at least one of the following measured variables:
electrical power generated with the wind turbine;
wind speed in an environment in which the wind turbine is operated;
a speed of the wind turbine;
at least one of flexural forces, deflections, and variations in stress on the rotor blades of the wind turbine;
vibration in the tower of the wind turbine.

6. The method as claimed in claim 1, wherein the technical system is a wind turbine, and the operating variables for the technical system comprise at least one of the following manipulated variables:
an angle of attack of rotor blades of the wind turbine;
a family of characteristic curves for the wind turbine, representing a relationship between speed and the electrical power generated by the wind turbine.

7. The method as claimed in claim 1, wherein the generated data-driven model is used to calculate at least one of a control model and a regulatory model for the operation of the technical system based on at least one optimization criteria,
wherein the control model or the regulatory model specifies changes for at least one manipulated variables from the operating variables for the technical system based on at least one measured variables from the operating variables for the technical system.

8. The method as claimed in claim 7, wherein the control model or the regulatory model of a gas turbine is calculated,
wherein the optimization criterion or criteria comprise at least one of a lowest possible pollutant emission, a lowest possible internal combustion dynamics, a highest possible efficiency, and a highest possible power.

9. The method as claimed in claim 1, wherein the control model or the regulatory model of a wind turbine is created,
wherein the optimization criterion or criteria comprise at least one of a highest possible efficiency for the wind turbine, a lowest possible flexural forces, deflections, and variations in stress on the rotor blades of the wind turbine.

10. The method as claimed in claim 1, wherein the control model or the regulatory model is embodied such that the respective confidence measures (CM) for data records comprising operating variables that arise during operation of the technical system are ascertained using the learnt density estimator (DE),
wherein the change in one or more manipulated variables from the operating variables is limited, or the operation of the function connected to the data-driven model or of the technical system is terminated or not started when the relevant confidence measure (CM) is below a predetermined threshold.

11. The method as claimed in claim 1, wherein the generated data-driven model is used to calculate a monitoring model that, in the event of one or more operating variables that arise during operation of the technical system deviating from the relevant operating variable(s) reproduced using the generated data-driven model (NM) by more than a predetermined measure, outputs a warning report or alarm report, or initiates an automated safety measure for the technical system.

12. The method as claimed in claim 11, wherein the monitoring model is embodied such that respective confidence measures (CM) for data records comprising operating variables that arise during operation of the technical system are ascertained using the learnt density estimator,
wherein the predetermined measure that is taken as a basis for generating a warning report is set greater the smaller the respective confidence measure (CM).

13. The method as claimed in claim 1, wherein at least one of the control model, the regulatory model, and the monitoring model is calculated on the basis of at least one of reinforcement learning, a model-predictive regulation, and an optimization method.

14. The method as claimed in claim 1, wherein at least one of the control model, the regulatory model, and the monitoring model is learnt on the basis of a neural network, particularly a recurrent neural network.

15. The method as claimed in claim 1, wherein a function that is dependent on the confidence measure (CM) and on the model error (ME) is used to select or weight the data records from the training data (TD).

16. The method as claimed in claim 1, wherein the data records from the training data are selected such that they are taken by means of sampling for the next iteration step on the basis of probabilities associated with the data records.

17. The method as claimed in claim 1, wherein the data records from the training data (TD) have associated weights (w1, w2, ..., wN) that are taken into account when learning the density estimator (DE) and the data-driven model (NM),
wherein the weights (w1, w2, ..., wN) are updated by means of the density estimator (DE) and of the data-driven model (NM) that have been learnt in a respective iteration step, such that data records from the training data (TD) with low confidence measures (CM) and high model errors (ME) are provided with higher weights.

18. The method as claimed in claim 17, wherein the weights (w) represent probabilities that are processed by the density estimator (DE) and the data-driven model (NM).

19. The method as claimed in claim 18, wherein at least one of the density estimator (DE) and the data-driven model (NM) selects data records from the training data (TD) on the basis of the probabilities for the learning or in the course of the learning.

20. The method as claimed in claim 1, wherein the method is initialized with initial weights (w) with a subset (RD) of data records from the training data (TD), which is stipulated on a random basis, in particular, or with all data records from the training data (TD).

21. The method as claimed in claim 1, wherein the density estimator (DE) is based on a neural clouds algorithm.

22. The method as claimed in claim 1, wherein the iteration is terminated when at least a predetermined proportion of the model errors (ME) for the data records selected or weighted for the next iteration step are below a predetermined threshold, or when at least a predetermined proportion of the confidence measures (CM) for the data records selected or weighted for the next iteration step are above a prescribed threshold.

23. A method for operating a technical system, wherein a data-driven model is generated using a method as claimed in claim 1, and is subsequently used for analyzing or influencing the operation of the technical system.

24. The method as claimed in claim 23, wherein the technical system is regulated, controlled, or monitored using the control model, regulatory model, or the monitoring model.

25. A computer-readable medium incorporating non-transitory instructions configured to carry out a method as claimed in claim 1, when the program code is executed on a computer.

* * * * *